Aug. 30, 1955     A. L. THURSTON     2,716,547
IN-MOTION WEIGHING OF VEHICLES AND APPARATUS THEREFOR
Filed Dec. 16, 1954     3 Sheets-Sheet 1

INVENTOR.
ARTHUR L. THURSTON
BY Steward + Spruegel
ATTORNEYS

Aug. 30, 1955  A. L. THURSTON  2,716,547
IN-MOTION WEIGHING OF VEHICLES AND APPARATUS THEREFOR
Filed Dec. 16, 1954  3 Sheets-Sheet 3

INVENTOR.
ARTHUR L. THURSTON
BY Steward + Sprugel
ATTORNEYS

United States Patent Office 2,716,547
Patented Aug. 30, 1955

2,716,547

IN-MOTION WEIGHING OF VEHICLES AND APPARATUS THEREFOR

Arthur L. Thurston, Wantagh, N. Y., assignor to Revere Corporation of America, Wallingford, Conn., a corporation of New Jersey Application December 16, 1954, Serial No. 475,800

6 Claims. (Cl. 265—71)

My invention relates relates to in-motion weighing of vehicles and to weighing apparatus for accomplishing the same. More particularly, it pertains to weighing of railway rolling stock during "humping" operations in a rail classification yard.

This application is a continuation-in-part for my prior, abandoned application Ser. No. 234,379, filed June 29, 1951, entitled "Railroad-Track Scale Assembly."

As is well known, it is common railroad practice to push a long line of freight cars to be classified to a "hump" or incline in the marshalling yards, at which point the cars are uncoupled, one by one, and allowed to roll free down the incline. As they proceed, they are switched to selected tracks for reassembly into new trains. In the course of this classifying operation, it is generally desirable to weigh each car and to record its weight against its identifying number for purposes of computing revenue, among other things. For various reasons, it is desirable to weigh the cars during the time they are rolling free down the hump, or incline, after being detached from the original line of cars. The weighing is accomplished as the car passes over "weighrails," which comprise a section of track supported independently of, but in line with, the adjoining track at each end of the section. This independently supported section, commonly termed a "weighbridge," is generally supported in a weighing pit in which there is located the supporting structure and weighing equipment, such as lever scales or weighing cells, for weighing the car as it is traveling over and is supported on the weighbridge. While the weighing of freight cars during humping operations has been done in the past, it has been subject to certain definite limitations, as will be presently pointed out, which are obviated by the method of and apparatus for in-motion weighing herein disclosed.

Up until the last few years, the motion weighing of vehicles, such as freight cars as indicated above, has been accomplished by having the weighrails of the scale disposed at a very small grade or incline to the horizontal, usually not over 1%. This was due largely to the fact that most of the control of the individual cars as they were humped was manual, and the rolling speed of the cars therefore had to be kept down to a point where they could be safely manipulated. Recently, the use of retarders, or braking devices on the tracks, has been greatly developed, particularly in conjunction with electronic control equipment by which the retarders are operated to control the car speed in accordance with the distance it has to roll, so that coupling to the car ahead in the train being made up takes place at a desired maximum speed, say three miles per hour. With such equipment, higher initial speeds of the cars is possible and this is of course desired to speed up the humping operation and permit more cars to be handled in a given time. For this reason, it has already been found advantageous to increase the grade up to 3%, and grades of 4% or perhaps more are entirely possible in humping operations of the future.

With such relatively steeper grades, each car of course has a much higher acceleration as it rolls across the scale or weighbridge than has been encountered in prior practice where grades of the aforesaid maximum of about 1% have been used. In weighbridge equipment employing the conventional system of levers or electronic weighing cells, the weight of the car in motion is different from its weight at rest because of the acceleration. While this difference was always present in such earlier weighbridge equipment, it was not appreciable owing to the relatively low accelerating forces involved where the grade of the weighrails is around 1%. However, this difference does become very material, and in some cases completely intolerable, with grades of 3% to 4%, as will be explained later.

If the acceleration of each car was the same as that of every other car, the weighing device could be adjusted to compensate for the difference between the static and motion weight, since the difference would be directly proportionate to the weight of the car in that event. However, the acceleration of a car depends not only on the grade of the weighrails, but also upon the friction in the wheels of the car, which varies from car to car, so that this expedient of "setting" into the scale equipment a compensating weight difference will not provide accurate in-motion weighing.

My invention, therefore, comprises so arranging the supporting members to the weighrails or weighbridge that the car thereon will produce the same weight indication in motion as it does at rest, regardless of its acceleration or the friction of its wheels. Briefly, I have found that so long as the check rod or rods conventionally employed in weighbridge equipment to prevent movement of the bridge longitudinally in the weighing pit are disposed parallel to the weighrails of the bridge, and the weighing cells or their equivalent are so positioned in the pit as to exert an upward component of force perpendicular to the rails, the force exerted by those cells will be equal or proportional to the true weight of the car, regardless of acceleration. Thus any angle of inclination can be employed for the weighbridge in order to obtain whatever speed of travel of the free-moving car may be desired.

In the accompanying drawings there is illustrated diagrammatically a comparison of the conventional weighbridge construction with alternate constructions possible in accordance with my invention, and analyses of the forces acting upon these constructions, respectively. In the drawings Fig. 1 is a schematic representation of a car free-rolling or coasting across an inclined weighbridge, the arrangement of the supporting and stabilizing members thereof being that employed conventionally heretofore;

Figure 3:
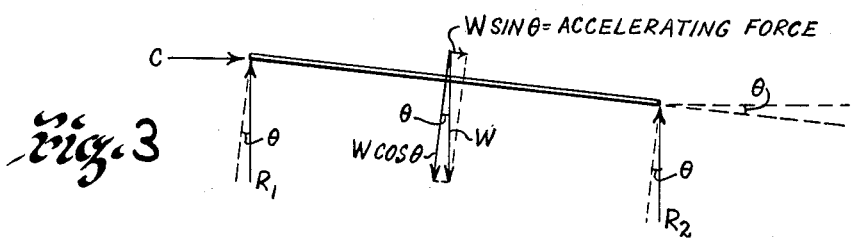
Fig. 3 shows diagrammatically the resolution of the force due to the weight of the car into components parallel and perpendicular to the weighbridge.
Figure 4:
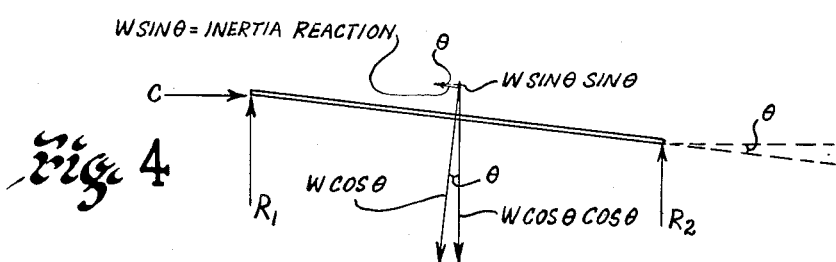
Figure 5:
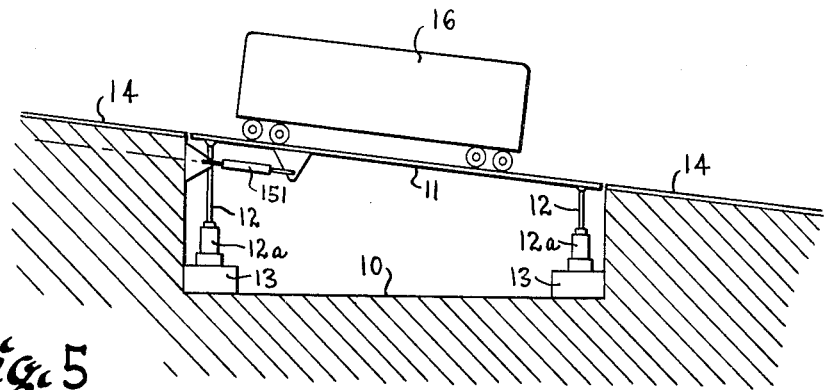
Figure 6:
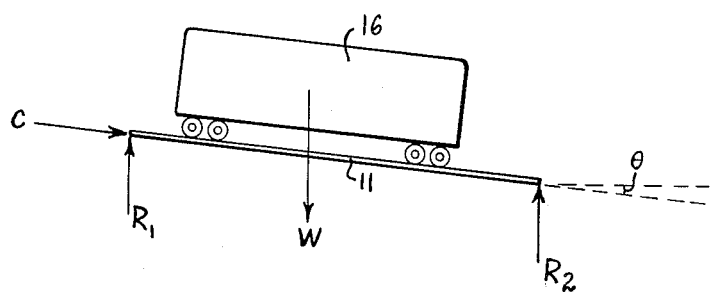
Figure 7:
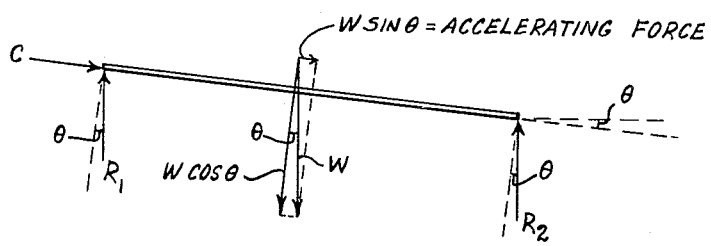
Figure 8:
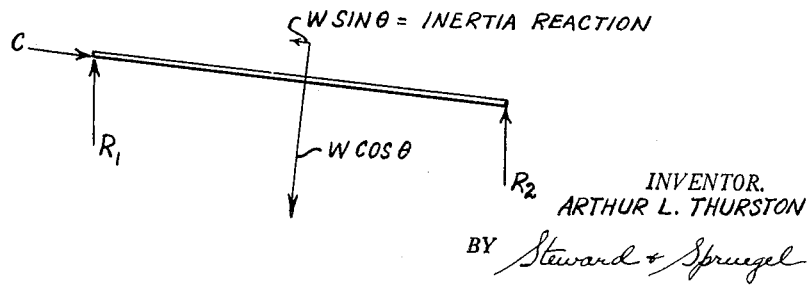
Figure 9:
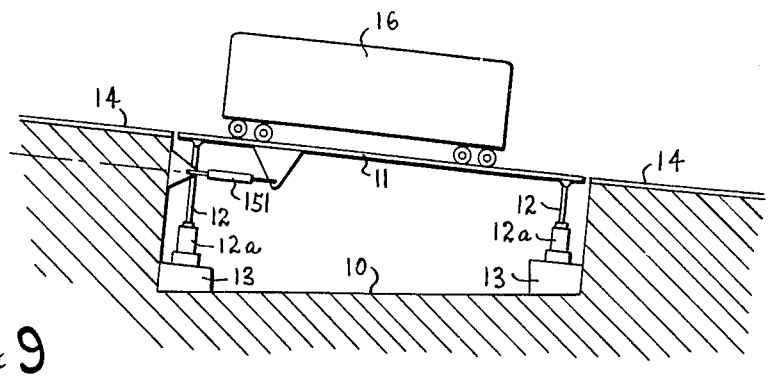
Figure 10:
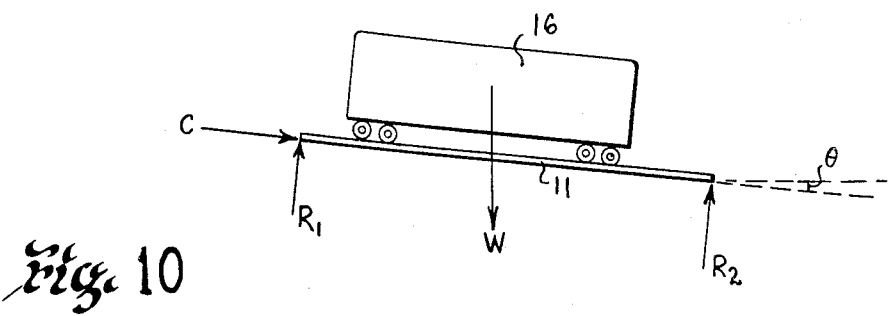
Figure 11:
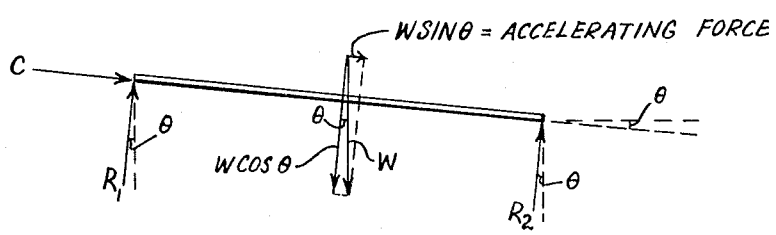
Figure 12:
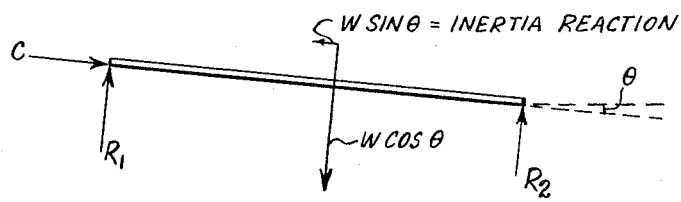

Fig. 4 corresponds to Fig. 3 except that the component of car weight parallel to the weighbridge is replaced by a reaction equal but opposite in direction to the corresponding component in Fig. 3;

Figs. 5 and 9 are schematic representations of cars free-rolling or coasting across inclined weighbridges, in which two different arrangements of supporting and stabilizing members in accordance with my invention are shown;

Figs. 6 and 10 represent the external forces on the systems of weighbridges and cars shown in Figs. 5 and 9, respectively;

Figs. 7 and 11 are diagrammatic representations, corresponding to Figs. 6 and 10, respectively, in which the weight of the cars is resolved in each instance into components parallel and perpendicular to the respective weighbridges; and Figs. 8 and 12 correspond, respectively, to Figs. 7 and 11, except that the parallel component in each instance is replaced by a reaction equal but opposite in direction to the respectively corresponding component in Figs. 7 and 11.

Figure 1:
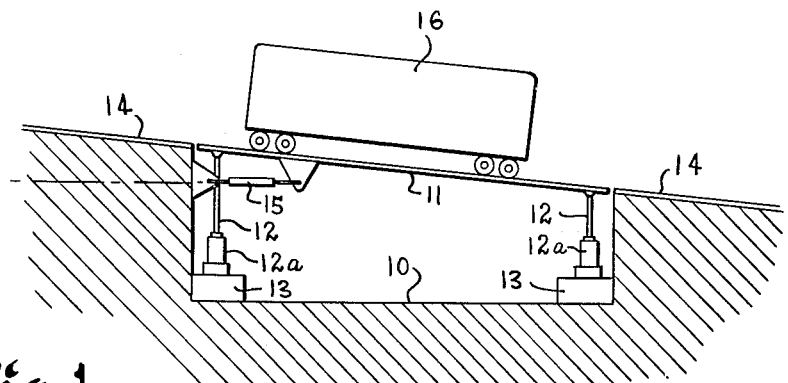

Referring to Fig. 1 of the drawings, the construction illustrated is typical of those conventionally employed heretofore in inclined weighbridges. As there shown, a weighing pit 10 is provided with weighrails 11 supported within the pit by suitable load transmitting members 12. The latter include weight responsive members 12a from which an indication of the imposed load can be obtained. Such weight responsive members may be any one of the various lever scale or hydraulic or electronic weighing cell arrangements commonly employed, but for purposes of simplifying the drawings these are shown here merely diagrammatically as cells 12a which are anchored on pillow blocks 13. The weighrails 11 are disposed by the foregoing supporting structure to lie exactly in the inclined plane of the adjoining fixed rails 14 leading to and from the pit, but are of course independent thereof to permit free vertical movement within limits. A horizontal check rod 15, secured at one of its ends to the end wall of the pit and at its other end to the weighrails, prevents longitudinal movement of the rails in the pit. The rod is transversely flexible or is otherwise secured so that it does not significantly impede slight movement perpendicular to the rod caused by the load imposed on the weighbridge, this movement being of course very small even in the case of mechanical weighing equipment, such as lever scales, and practically negligible where electronic strain gauge equipment is employed. In actual practice, of course, more than one of these longitudinal check rods may be employed.

A car 16 is shown wholly supported on the rails 11 and is free-rolling down along it under the influence of gravity due to the inclination of the fixed rails 14 and weighrails 11 which are disposed at an angle $\theta$ to the horizontal.

Figure 2:
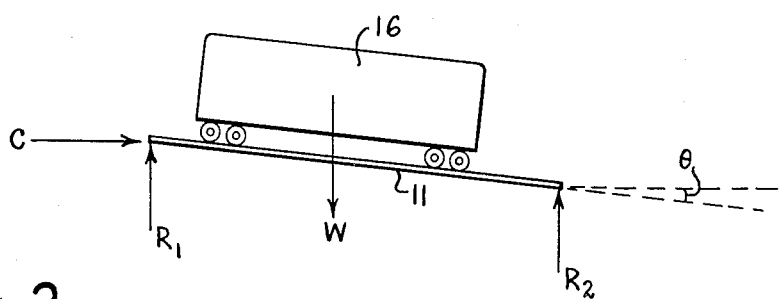
Fig. 2 is a diagrammatic representation of the external forces on the system of the weighbridge and car in the conventional arrangement shown in Fig. 1.

Referring now more particularly to Fig. 2, it will be seen that the external forces on the car 16 and weighrails 11 of Fig. 1 comprise the weight W of the car, which being a gravitational force is vertical; the vertical reaction forces $R_1$ and $R_2$ exerted on the weighrails by the cells 12a; and a horizontal force C exerted on the weighrails by the check rod 15, as will presently be explained. In the weighing operation, $R_1$ and $R_2$ are of course totalized and the relative distribution of the load between the two is not important. Any moments or couples introduced by these forces may therefore be neglected. Also, since the weighbridge and rails can, for all practical purposes, be considered to be held substantially rigidly in place, and their weight zeroed out in the indicating equipment, their mass or weight does not enter into the calculations. For simplicity it will also be assumed here that there are no frictional forces. Car 16 thus rolls freely down along the weighrail, and its acceleration will be linear in a direction parallel to the rail. As shown in Fig. 3, therefore, the accelerating force will be $W \sin \theta$, while the other component of W will be a force $W \cos \theta$ acting perpendicular to the rail.

According to D'Alembert's Principle, if the accelerating forces in a dynamic problem are replaced by inertia reactions equal to the accelerating forces but opposite in direction, the problem may be treated and solved as one in statics. For a fuller consideration of this principle, reference is made to the work entitled "Mathematical and Physical Principles of Engineering Analysis," by Walter C. Johnson, published by McGraw-Hill Publishing Company.

Applying this principle and replacing the accelerating force $W \sin \theta$ by an inertia reaction equal but opposite in direction, we have the forces as shown in Fig. 4, which may now be solved as a problem in statics. That is, the sum of the forces perpendicular to any plane must equal zero. Resolving the forces perpendicular to the horizontal plane in Fig. 4, we have:

$$R_1 + R_2 - W \cos \theta \cos \theta + W \sin \theta \sin \theta = 0$$

Assuming, for example, $W = 100,000$ pounds and a grade of 3%, then $$\sin \theta = 0.03$$
$$\cos \theta = 0.99955$$

Substituting, and solving the equation above, $$R_1 + R_2 = 99,820$$

or a difference between motion and static weights of the car of 180 pounds per 100,000 pounds of car weight.

As mentioned above, friction was disregarded in the foregoing consideration, but it will be apparent that any friction present will decrease the acceleration of the car and therefore decrease the inertia reaction and consequently the difference between the in-motion and static weights. That is, the 180 pound difference per 100,000 pounds of car weight is the maximum theoretical difference possible for a 3% grade. Similarly, if the friction were sufficiently high such that the car did not accelerate but rolled down the incline at constant velocity, the static and motion weights would be the same. Therefore, with the conventional system shown in Fig. 1, there is a possible difference between motion and static weights of from 0 to 180 pounds per 100,000 pounds of car weight for a 3% grade, depending upon the friction present. With a 4% grade, the possible variation lies in the range between 0 and 320 pounds per 100,000 pounds of car weight.

An actual check of the motion weights and static weights obtained on an installation such as that shown in Fig. 1, where the weighrails were on a 3% grade, showed an average variation of 160 pounds per 100,000 pounds of car weight, with the cars showing a lighter weight in motion than when weighed statically. This figure of 160 pounds, however, is an overall average for the entire number of cars, about 500, which were tested. It is not, therefore, a figure which can be set into the weighing equipment as a predetermined correction factor as a means of obtaining an accurate weight indication of an individual car.

Turning now to Fig. 5, there is shown one general arrangement of a weighbridge support and weighing equipment involving my invention. This differs importantly from the arrangement shown in Fig. 1 in that the longitudinal check rod 151 in Fig. 5 is disposed parallel to the weighrails, instead of being horizontal. In Fig. 6, the external forces acting on the car and bridge in this system are shown. Resolving the weight W of car 16 into components parallel and perpendicular to the weighrails, we again find that the parallel component or accelerating force is $W \sin \theta$, and the component perpendicular to the rails is $W \cos \theta$. Applying D'Alembert's Principle, and substituting for the accelerating force an inertia reaction of equal magnitude but opposite in direction, the condition shown in Fig. 7 is obtained, which can be treated as a static one. Summating the forces perpendicular to the weighrails in this system, we have:

$$R_1 \cos \theta + R_2 \cos \theta - W \cos \theta = 0$$

or $$R_1 + R_2 = W$$

Thus, in this system, the scale indication will be the same whether the car is stationary or in motion and the sum of the forces $R_1$ and $R_2$ will equal directly the true weight of the car regardless of grade, friction or variations in the accelerations of the cars.

A second arrangement embodying my invention is illustrated in Fig. 9 in which the check rod 151 is again positioned parallel to the weighrails but the weighing cells 12a are disposed at an incline to receive and measure the forces directly perpendicular to the rails. The external forces on the car and weighbridge are shown in Fig. 10 and the weight W of the car is shown in Fig. 11 broken down into its parallel and perpendicular components as before. Substituting the inertia reaction for the accelerating forces, and summating the forces perpendicular to the weighrails, we see, from Fig. 12, that:

$$R_1 + R_2 - W \cos \theta = 0$$

or $$R_1 + R_2 = W \cos \theta$$

In this case, the weight of the car will be the same statically or in motion, but the actual forces measured will be equal to the true weight multiplied by $\cos \theta$. Since $\cos \theta$ is a constant for any installation, the scale equipment can readily be adjusted to take this constant into consideration so that the resulting visual or other weight indication will give the true weight directly. In practice, this is easily accomplished at the time of installing the weighing equipment by spotting test cars of known weight on the scales and adjusting the so-called "nose iron" of lever type scales, or the "slope" of cell-type scales, until the indicated weight is equal to the known weight of the car. The correction factor thus introduced will then be constant and totally independent of acceleration for that installation.

It has thus been shown that so long as the longitudinal check rod is parallel to the weighrails, the force exerted upward by the weighing cells on the rails when a load is imposed on them will be equal or proportional to the true weight of the car. Where the cells are disposed to direct a force vertically on the rails (Fig. 7), the ratio of true to apparent weight is 1:1. Where the cells are positioned to direct a force perpendicular to the rails, the ratio is $$\frac{1.00}{\cos \theta}$$

as in Fig. 10. It can also be shown in like manner that the cells may be positioned to exert an upward force on the weighrails in directions intermediate or adjacent the two directions specifically discussed hereinabove, so long, of course, as the force exerted by them is substantially opposite in direction to the weight imposed on the weighrails. For such different positions of the cells or their equivalent, the ratio of true to apparent weight will be different from either of those in the specific examples given, but in all cases the ratio will be constant for any installation and can be readily determined in practice by the "spotting" method mentioned.

Thus it now becomes practical for the first time to accomplish truly accurate in-motion weighing of vehicles as they roll down a grade or inclination solely by gravity, regardless of the steepness of the grade or of variations in the friction present in the rolling vehicle.

What is claimed is:

1. The method of weighing a rolling vehicle while in motion along the weighrails of a weighbridge, which comprises so inclining the weighrails as to cause the vehicle to roll therealong under the influence of gravity, and while said vehicle is so moving exerting on the weighrails a measurable force proportional to and substantially opposite to the weight of the vehicle to be weighed, and exerting on the weighrails a second force at all times parallel to the weighrails.

2. The method as defined in claim 1, wherein said measurable force is exerted vertically.

3. The method as defined in claim 1, wherein said measurable force is exerted in a direction perpendicular to said weighrails.

4. A weighbridge for weighing vehicles free-rolling under the influence of gravity down an incline, weighrails on said bridge disposed in the plane of said incline for guiding said vehicles across said bridge, adjoining rails leading to and from said weighbridge, support means for supporting said bridge and weighrails independently of said adjoining rails, said support means comprising load transmitting members disposed to receive and support the weight of said weighbridge and a vehicle thereon, said load transmitting members including weighing means responsive to the imposed load and providing an indication thereof, and stabilizing means for preventing longitudinal movement of said weighbridge while permitting slight vertical movement thereof, said stabilizing means being all disposed parallel to said inclined weighrails.

5. A weighbridge as defined in claim 4, wherein said load transmitting members are disposed vertically.

6. A weighbridge as defined in claim 4, wherein said load transmitting members are disposed perpendicularly to said weighrails.

No references cited.